United States Patent [19]
Campiotti et al.

[11] Patent Number: 4,950,864
[45] Date of Patent: Aug. 21, 1990

[54] DC ARC WELD STARTER

[75] Inventors: Richard H. Campiotti, Tracy; James E. Hopwood, Oakley, both of Calif.

[73] Assignee: The United States of America as represented by the United States Department of Energy, Washington, D.C.

[21] Appl. No.: 311,781

[22] Filed: Feb. 17, 1989

[51] Int. Cl.$^5$ .............................................. B23K 9/06
[52] U.S. Cl. ................................ 219/130.4; 219/130.5
[58] Field of Search ................. 219/130.4:130.1, 130.5

[56] References Cited

U.S. PATENT DOCUMENTS

| | | | |
|---|---|---|---|
| 2,922,871 | 1/1960 | Hackman et al. | 219/130.4 |
| 2,993,984 | 7/1961 | Sullivan | 219/130.4 |
| 3,051,829 | 8/1962 | Manz | 219/130.4 |
| 3,241,218 | 3/1966 | Phillips | 219/130.4 |
| 3,253,119 | 5/1966 | Manz | 219/130.4 |
| 3,502,897 | 3/1970 | McCollister et al. | 219/130.4 |
| 3,571,558 | 3/1971 | Hogan, Jr. | 219/130.4 |
| 4,672,175 | 6/1987 | Niven | 219/130.4 |

FOREIGN PATENT DOCUMENTS 448091 6/1975 U.S.S.R. ............................ 219/130.4

OTHER PUBLICATIONS

M. Brown, "Initiation of a Tungsten Inert Gas Arc by High Voltage D.C." Welding Institute Report, 1976, pp. 1-16.
J. Needham, "Arc Stability In Gas—Shelded Arc Welding: Part 3 Alternating Current Arcs" Welding Institute Research Bulletin, 1969, pp. 39-40.
J. Needham, "Improvements In DC and AC Power Supplies".
J. Hopwood, "Initiation of GTAW Arcs by High Voltage Impulses", Sandia Report SAND82-8020, 8/1982, pp. 3-18.

Primary Examiner—Clifford C. Shaw
Attorney, Agent, or Firm—George H. Libman; James H. Chafin; William R. Moser

[57] ABSTRACT

A system for starting an arc for welding uses three DC power supplies, a high voltage supply for initiating the arc, an intermediate voltage supply for sustaining the arc, and a low voltage welding supply directly connected across the gap after the high voltage supply is disconnected.

5 Claims, 2 Drawing Sheets

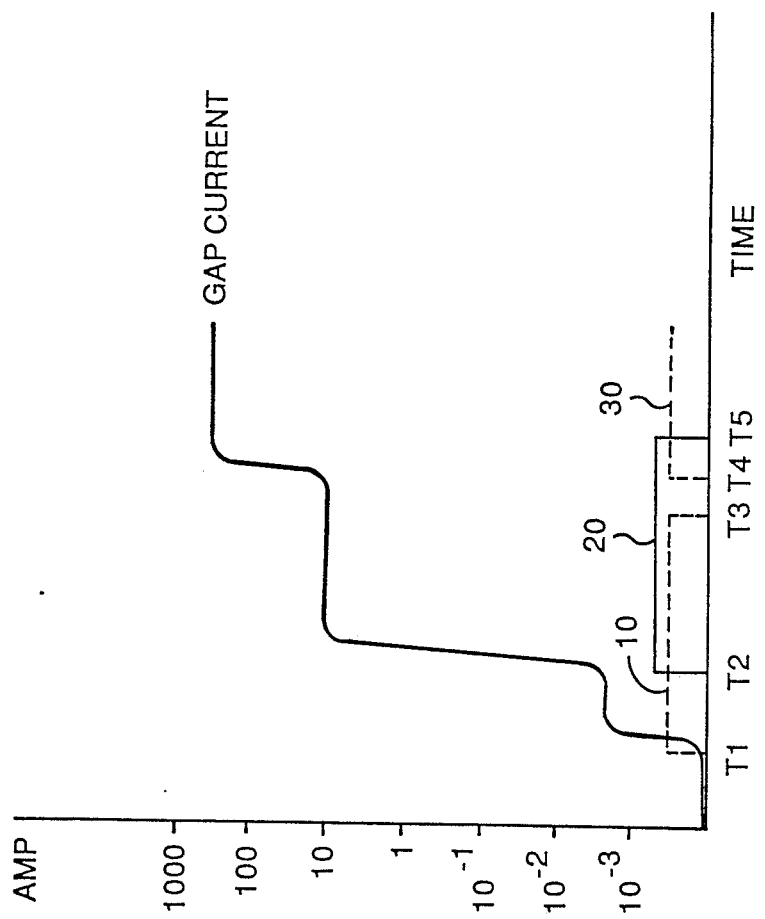

DC ARC WELD STARTER

The United States Government has rights in this invention pursuant to Contract No. DE-AC04-76DP00789 between the Department of Energy and AT&T Technologies, Inc.

BACKGROUND OF THE INVENTION

The present invention relates to a system for starting a welding arc and, more particularly, to a system for starting a welding arc without using AC voltage and without having a diode in the circuit of the welding power supply.

In arc welding, the voltage of the open-circuited, high current, welding power supply is always much lower than the breakdown voltage across the electrode-to-workpiece gap. Therefore, additional means must be provided for initiating the arc.

These means, typically, include moving the electrode to touch the workpiece, or applying a high starting voltage across the gap for a short period of time. In many welding applications, touching has serious drawbacks such as weld contamination, difficult implementation in automated welding situations, and possible burn-through of the work. Application of a high AC voltage solves these problems, because the AC voltage can be tailored to break down the gaseous atmosphere in the gap and form a conducting plasma which will sustain an arc from the lower-voltage DC power supply.

The AC starting voltage does have a significant disadvantage in some applications; i.e., it radiates energy as RF interference for electrical circuits that may be either on the workpiece or controlling the welding machine. For this reason, the use of high voltage DC to initiate the gap has been explored.

U.S. Pat. No. 3,571,558 by John A. Hogan, Jr., shows an arc starting system where a high voltage output of a step-up transformer is half-wave rectified by a diode. Once gap breakdown occurs, the welding power supply begins to conduct through the diode. In order to protect this diode, which must support the heavy welding current, the patent also provides sensing and bypass relays to short circuit the diode once welding current begins to flow.

U.S. Pat. No. 4,672,175 by Robert W. Nivens shows another arc starter where the high voltage power supply is powered by the welding power supply and which uses an arc detector to operate a relay to bypass a diode in series with the welding power supply.

Each of the aforementioned patents recognize that the diode in series with the welding power supply must carry the heavy welding current, and try to minimize the effect on this diode by bypassing it as quickly as possible. This invention also recognizes the same problem, but solves it by eliminating the series diode and connecting the welding power supply directly across the gap.

SUMMARY OF THE INVENTION

It is an object of this invention to provide a system for starting a welding arc with high DC voltage that does not have a diode in series with the welding power supply.

It is another object of this invention to provide a system for starting a welding arc that uses a high DC voltage to start an arc, an intermediate DC voltage to sustain the arc while the high voltage is disconnected, and a low DC voltage welding power supply.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present apparatus of the invention may comprise an initial high voltage dc power supply to initiate an arc across a welding gap, a pilot dc power supply to provide an intermediate voltage, intermediate current, output of sufficient power to sustain the arc, and a welding dc power supply for arc welding. A controller first selectively connects the high voltage power supply across the gap to initiate the arc. The controller then connects the pilot power supply across the gap after said arc is initiated, and disconnects the high voltage power supply. The controller then connects the welding power supply directly across the gap.

The invention also is a method of controlling the starting of a welding arc comprising the steps of providing a high voltage, low current, output of sufficient voltage to initiate an arc across a gap; providing an intermediate voltage, intermediate current, output in parallel with the high voltage of sufficient power to sustain the arc across the gap; removing the high voltage from the gap; providing a low voltage, high current output of sufficient power for arc welding directly across the gap in parallel with the intermediate voltage; and removing the intermediate voltage from said gap.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 2 shows a timing diagram of the operation of the invention.

DETAILED DESCRIPTION

Figure 1:
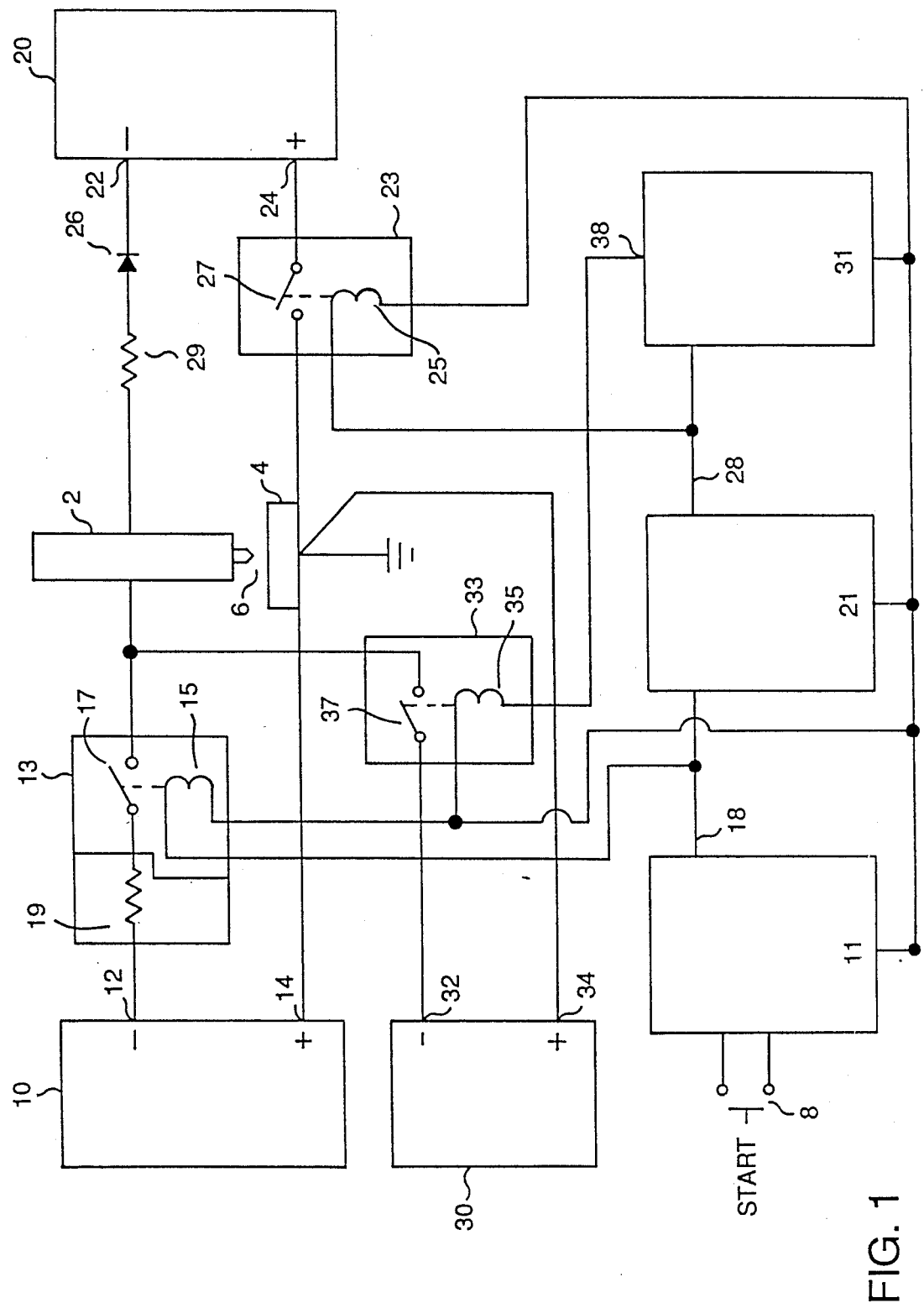
FIG. 1 shows a schematic diagram of one embodiment of the invention.

A typical system for starting a gas tungsten arc welder having a conventional welding electrode 2 spaced from an electrically conductive workpiece 4 across a welding gap 6 is shown in FIG. 1. The structure of arc welding devices is well known in the art, and does not form a part of this invention. The operation of an arc welder typically requires an initial voltage on the order of several kilovolts to initiate breakdown of gases in the gap in order that electrons will flow from the electrode 2 across gap 6 to workpiece 4. Once the current flow of electrons occurs, the voltage across gap 6 drops to the order of ten volts.

Three DC power supplies are provided in accordance with this invention: a high voltage, low current, initial power supply 10 for initiating an arc; an intermediate voltage, intermediate current, power supply 20 for sustaining the arc while the initial supply is disconnected; and a low voltage, high current, welding power supply 30 for providing the welding current. The output of each of these power supplies is selectively connected across gap 6 (i.e., the negative terminal of the supply is connected to electrode 2 and the positive terminal is connected to workpiece 4) to provide the operation shown in FIG. 2.

In a particular embodiment of the invention shown in FIG. 1, high voltage supply 10 has a 3 KV, 5 mA, negative output terminal 12 connected in series to electrode 2 through a current limiting resistor 19 and the contacts 17 of relay 13. Positive output terminal 14 of supply 10 is connected to grounded workpiece 4. Controlling coil 15 of relay 13 is connected to the output of a first timing circuit 11.

Intermediate power supply 20 is a 96 volt, 5 amp battery having a negative output 22 connect in series to electrode 2 through a diode 26 and a current limiting resistor 29. Diode 26 is polarized, by connecting its negative terminal to output 22, to prevent the high voltage from supply 10 from reaching supply 20. The positive output terminal 24 is connected in series to workpiece 4 through the contacts 27 of relay 23. Controlling coil 25 of relay 23 is connected to the output 28 of a second timing circuit 21.

Conventional welding power supply 30 has a 300 amp negative output terminal 32 connected directly to electrode 2 through contacts 37 of relay 33. The positive output terminal 34 of supply 30 is connected directly to workpiece 4. Controlling coil 35 of relay 33 is connected to the output 38 of a third timing circuit 31.

"Connected directly", in the context of this invention, means there is no resistive impedance in the circuit other than the nominal impedance of the closed relay contacts and the connecting wires. More particularly, it means there are no resistors or diodes in the current loop extending from the negative welding supply terminal 32 to electrode 2, across gap 6 to workpiece 4, and back to positive terminal 34. The significance of this feature of the invention is that welding current usually must be limited when it must pass through a diode, to prevent damage to the diode.

Although not shown in detail, each of timing circuits 11, 21, and 31 may be formed of timing logic circuitry and driving amplifiers designed to operate relays 13, 23, and 33 in accordance with the teachings of this invention. Alternatively, timing circuits 11, 21, and 31 may also be part of a computerized controller for the welding apparatus. Implementation of either embodiment is well within the ordinary skill of routine workers in the electronics field.

The operation of the apparatus and method of the invention is shown in FIG. 2. The bottom trace shows when each power supply 10, 20, and 30 is connected across gap 6 (and when each of relay contacts 17, 27, and 37 are closed); the other trace shows the current in the gap from time T1, when the system is started, until time T5, when normal welding begins.

When starting switch 8 is actuated at time T1, output 18 of timing circuit 11 energizes relay coil 15, closing contacts 17, and causing the 3000 volt negative output of supply 10 to be placed across gap 6 through resistor 19. The high voltage across gap 6 causes breakdown of gases in the gap, and current flow across the gap. The voltage across the gap rapidly drops from the initial 3000 volts to the arcing voltage of about 10 volts. (The magnitude of the arcing voltage is a function of the gap distance.) The output current from supply 10 is limited by resistor 19 to several milliamps. Diode 26 prevents this high negative voltage from reaching negative terminal 22 of intermediate power supply 20 in the same manner as the diodes of the earlier patents of Hogan and Niven.

Output 18 of timing circuit 11 is also connected to the input of timing circuit 21. After a time T2 of sufficient length for the arc to start (typically, a couple of seconds), timing circuit 21 energizes coil 25 of relay 23, closing relay contacts 27 and connecting the positive terminal 24 of intermediate supply 20 to workpiece 4. The current across gap 6 increases to the order of several amperes. No protection of diode 26 is needed, as taught by the Hogan and Niven patents, because the intermediate current through the diode is much less than the welding current their diodes had to support.

At time T3, after a few more seconds for the electrode temperature to increase due to the increased current flow, timing circuit 11 opens relay 13, removing the 3000 volt output 12 of high voltage supply 10 from gap 6. At this time, the arc is sustained by intermediate supply 20.

Output 28 of timing circuit 21 is also connected to the input of timing circuit 31. At a time T4, preferably a couple of seconds after time T3, timing circuit 31 energizes relay coil 35, closing contacts 37 and connecting the negative terminal 32 of welding power supply 30 directly to electrode 2. Welding now begins, as the 300 amp current from supply 30 passes across gap 6 to the workpiece 4. High voltage power supply 10 is protected from the high weld current because it was been removed from the circuit when contacts 17 opened. Intermediate power supply 20 is protected from the high weld current 29 for a sufficient period of time until time T5 for timing circuit 21 to open relay 23, and thereby remove intermediate supply 20 from gap 6.

The particular sizes and equipment discussed above are cited merely to illustrate a particular embodiment of this invention. It is contemplated that the use of the invention may involve components having different sizes and shapes as long as the principle of using three switchable power supplies to initiate a weld arc, the welding supply being directly connected to the welding gap, is followed. It is intended that the scope of the invention be defined by the claims appended hereto.

We claim:

1. A system for starting an arc welder having an electrically conductive electrode spaced across a gap from an electrically conductive workpiece, said system comprising:

initial dc power supply means for providing a high voltage, low current, output of sufficient voltage to initiate an arc across said gap;

intermediate dc power supply means for providing an intermediate voltage, intermediate current, output of sufficient power to sustain an arc across said gap;

welding dc power supply means for providing a low voltage, high current output of sufficient power for arc welding;

first control means for selectively connecting the output of said initial power supply means across said electrode and said work to initiate an arc;

second control means for selectively connecting the output of said intermediate power supply means across said electrode and said work after said arc is initiated; said first control means disconnecting said initial power supply after said intermediate power supply has been connected; and third control means for selectively connecting the output of said welding power supply means directly across said electrode and said work after said initial power supply has been disconnected.

2. The system of claim 1 wherein said first control means comprises a first relay controled by a first timer, said first relay having switchable contacts serially connected between said initial power supply means and said gap, said first timer causing said first relay to close its contacts at a time T1 and to open its contacts at a time T3;

wherein T1 occurs before T3.

3. The system of claim 2 wherein said second control means comprises a second relay controled by a second timer, said second relay having switchable contacts serially connected between said intermediate power supply and said gap, said second timer causing said second relay to close its contacts at a time T2 and open its contacts at a time T5;

wherein said times occur in the order: T1, T2, T3, T5.

4. The system of claim 3 wherein said third control means comprises a third relay controled by a third timer, said third relay having switchable contacts serially connected between said welding power supply and said gap, said third timer causing said third relay to close its contacts at a time T4;

wherein said times occur in the order: T1, T2, T3, T4, T5.

5. A method for starting an arc welder having an electrically conductive electrode spaced across a gap from an electrically conductive workpiece, said method comprising:

providing a high voltage, low current, output of sufficient voltage to initiate an arc across said gap;

providing an intermediate voltage, intermediate current, output of sufficient power to sustain an arc across said gap in parallel with said high voltage;

removing said high voltage from said gap;

providing a low voltage, high current output of sufficient power for arc welding directly across said gap in parallel with said intermediate voltage; and removing said intermediate voltage from said gap.

* * * * *